US 6,751,376 B2

(12) United States Patent
Hammond

(10) Patent No.: US 6,751,376 B2
(45) Date of Patent: Jun. 15, 2004

(54) INTEGRATED MICRO-OPTICAL ELEMENTS

(75) Inventor: Benjamin Hammond, Manningtree (GB)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/354,607

(22) Filed: Jan. 30, 2003

(65) Prior Publication Data

US 2003/0174407 A1 Sep. 18, 2003

(30) Foreign Application Priority Data

Mar. 16, 2002 (EP) ............................................. 02251901

(51) Int. Cl.[7] ................................................ G02B 6/42
(52) U.S. Cl. ............................ 385/31; 385/49; 385/33; 385/92; 385/93; 385/14
(58) Field of Search ............................ 385/49, 31, 33, 385/34, 15, 88, 89, 92, 93, 14

(56) References Cited

U.S. PATENT DOCUMENTS

| 4,222,629 A | | 9/1980 | Dassele et al. ............ 385/53 X |
| 4,735,677 A | | 4/1988 | Kawachi et al. ............. 156/633 |
| 4,741,796 A | | 5/1988 | Althaus et al. ........... 156/272.4 |
| 5,079,130 A | * | 1/1992 | Derkits, Jr. ................. 430/321 |
| 5,301,251 A | | 4/1994 | Moore et al. .................. 385/91 |
| 5,917,652 A | * | 6/1999 | Mathers et al. .............. 359/534 |
| 6,278,819 B1 | * | 8/2001 | Reddy .......................... 385/37 |

FOREIGN PATENT DOCUMENTS

| EP | 0 893 720 | 1/1999 | ............... 385/93 X |
| JP | 60161684 | 8/1985 | ............... 385/93 X |

OTHER PUBLICATIONS

Heck et. al., "Spherical Lens and Optoelectronic . . ", U.S. Patent Application Publication, U.S. 2002/0191655 A1, published Dec. 19, 2002.*
Mathyssek, K., Examiner, European Search Report, Application No. EP 02 25 1901, dated Sep. 18, 2002.

* cited by examiner

Primary Examiner—Brian M. Healy

(57) ABSTRACT

The integration of micro-optical elements on a semiconductor substrate, particularly elements, such as glass-material optical components, such as lenses, beam splitters, mirrors and polarizing elements. A micro-optical device comprising a silicon substrate, and at least one glass-material micro-optical element mounted on the substrate. The device also includes a glass-material stand, for example, a grass frit, interposed between the micro-optical element and substrate. The stand is fuse-bonded to both the substrate and the micro-optical element. The substrate has, within a groove, a recess bounded by one or more walls, and the stand is dimensioned to fit within the recess and be positioned by one or more walls of the recess.

17 Claims, 2 Drawing Sheets

INTEGRATED MICRO-OPTICAL ELEMENTS

BACKGROUND OF THE INVENTION

1. Field of the Invention

The present invention relates to the integration of micro-optical elements on a semiconductor substrate, particularly glass-material optical components such as lenses, beam splitters, mirrors and polarising elements that are to be mounted on a silicon substrate.

2. Discussion of the Background Art

Opto-electronic devices, for example laser transmitter and receiver units for use in fibre optic transmission systems, and laser diode units for use in applications as diverse as optical data storage and laser range finding systems, often combine a solid state optical source or detector with a number of glass-material micro-optical elements, such as a collimating lens, beam splitter, polarising element or optical waveguide. These elements may have to be secured in a particular orientation with respect to an opto-electronic element. In particular, the position of a collimating micro-lens or a focussing micro-lens may need to be held to an accuracy of less than 1 $\mu$m for up to 25 years for the performance of a product to be maintained.

Because silicon processing is a well-established and economical technology, micro-optical elements are often secured to a machined and etched silicon substrate, formed as one of many from a larger silicon wafer. Electrical connections and insulating areas can also be conveniently formed on such a substrate by well-known means. One way in which a bond can be made between the micro-optical elements and the substrate is by using an epoxy adhesive, for example an ultraviolet or thermal curing epoxy adhesive. Although it is possible to obtain good long term dimensional stability with such adhesives, a problem has been noted that such cured epoxy adhesives can move or deform in subsequent processing of the substrate, or due to temperature excursion experienced during normal operation of the product, and environmental factors. For example, when a solder connection is made to a contact pad on the substrate, the cured adhesive can be raised to a temperature of 320° C. to 350° C. This can cause the position of the secured micro-optical element to shift, thus affecting adversely the performance of the opto-electronic device.

In many applications it is also necessary that the opto-electronic element is able to survive mechanical shocks that could dislodge a micro-optical element secured to the substrate. In practice, the micro-optical element should be able to withstand a static force of at least about 0.5 N.

It is an object of the present invention to provide a micro-optical device, and a method for forming such a device, that addresses these issues.

SUMMARY OF THE INVENTION

According to the invention there is provided a micro-optical device, comprising a semiconductor material substrate, and at least one glass-material micro-optical element mounted on said substrate, characterised in that the device includes a glass-material stand interposed between said micro-optical element and said substrate, said stand being fuse-bonded to both the substrate and the micro-optical element.

Also according to the invention, there is provided an opto-electronic device, comprising at least one opto-electronic element and a micro-optical device, characterised in that the micro-optical device is according to the invention and in that the opto-electronic element is secured to said substrate and coupled optically with said at least one micro-optical element.

It has been found that the fuse-bonding of the stand to the adjacent substrate and micro-optical element forms a secure and stable mount of the micro-optical element to the substrate, with very low creep over time. The glass transition or melting point of the glass material stand will be related to a suitable fuse-bond temperature and bonding time. The fuse-bond temperature can be chosen to be lower than that of the micro-optical element, so that the element is essentially unaffected by the fuse-bonding process. In addition, the fuse temperature can be chosen to be sufficiently higher than temperatures expected in subsequent processing, for example from soldering of electrical contacts, so that the fuse-bonded stand is essentially unaffected by such subsequent temperatures.

In a preferred embodiment of the invention, the micro-optical element is a lens arranged to couple optical radiation into (or out of) one or more opto-electronic elements.

Prior to formation of the micro-optical device, the stand may be a partially fused glass-material frit. This is a convenient way to form an glass-material stand that has a particular desired shape. The frit is sufficiently robust so that it may be handled, for example by a micro-manipulator such as a vacuum pick-up tool, and then placed in position on the substrate. The fuse-bonding process may then further fuse together the frit, so that this becomes a fused frit.

In a preferred embodiment of the invention, the substrate has a recess in a surface thereof, said recess being bounded by one or more walls. The stand may then conveniently be dimensioned to fit within the recess and be positioned by one or more walls of said recess.

In its simplest form, the recess may be a circular recess, in which case there may be just one circular wall. In a preferred embodiment of the invention the recess is in a groove with opposite side walls that position the stand in a first direction. The recess and the stand may then have therebetween an alignment feature that aligns the stand in a second direction transverse to the first direction.

For example, the alignment feature may be a ridge on one of the stand or the recess, and a groove matching the ridge on the other of the stand or the recess.

The invention also provides a method of forming a micro-optical device, said device comprising a semiconductor material substrate, at least one glass-material micro-optical element and at least one glass-material stand, characterised in the method comprises the steps of:

i) bringing together the micro-optical element and the substrate so that a stand is interposed between the micro-optical element and the substrate;
ii) heating the stand so that this becomes fuse-bonded to both the substrate and the micro-optical element, thereby mounting said micro-optical element to the substrate; and
iii) then allowing the stand to cool down so as to fix the bond between the stand and said micro-optical element and between said stand and the substrate.

Step ii) may then be accomplished by applying heat through the substrate towards the stand. For example, a heater may be affixed to a rear surface of the substrate, so that heat conducted through the substrate causes the fuse-bonding of the stand.

The invention further provides a method of forming an opto-electronic device, said opto-electronic device comprising at least one opto-electronic element and a micro-optical device, characterised in that said micro-optical device is formed according to the method of forming a micro-optical device according to the invention, and the opto-electronic device is then formed by the step of securing said opto-electronic element to said substrate so that said opto-electronic element is coupled optically with at least one of said fuse-bonded micro-optical elements.

BRIEF DESCRIPTION OF THE DRAWINGS

The invention will now be described in greater detail, and by way of example only, with reference to the accompanying drawings, in which.

DETAILED DESCRIPTION OF THE PREFERRED EMBODIMENT

Figure 1:
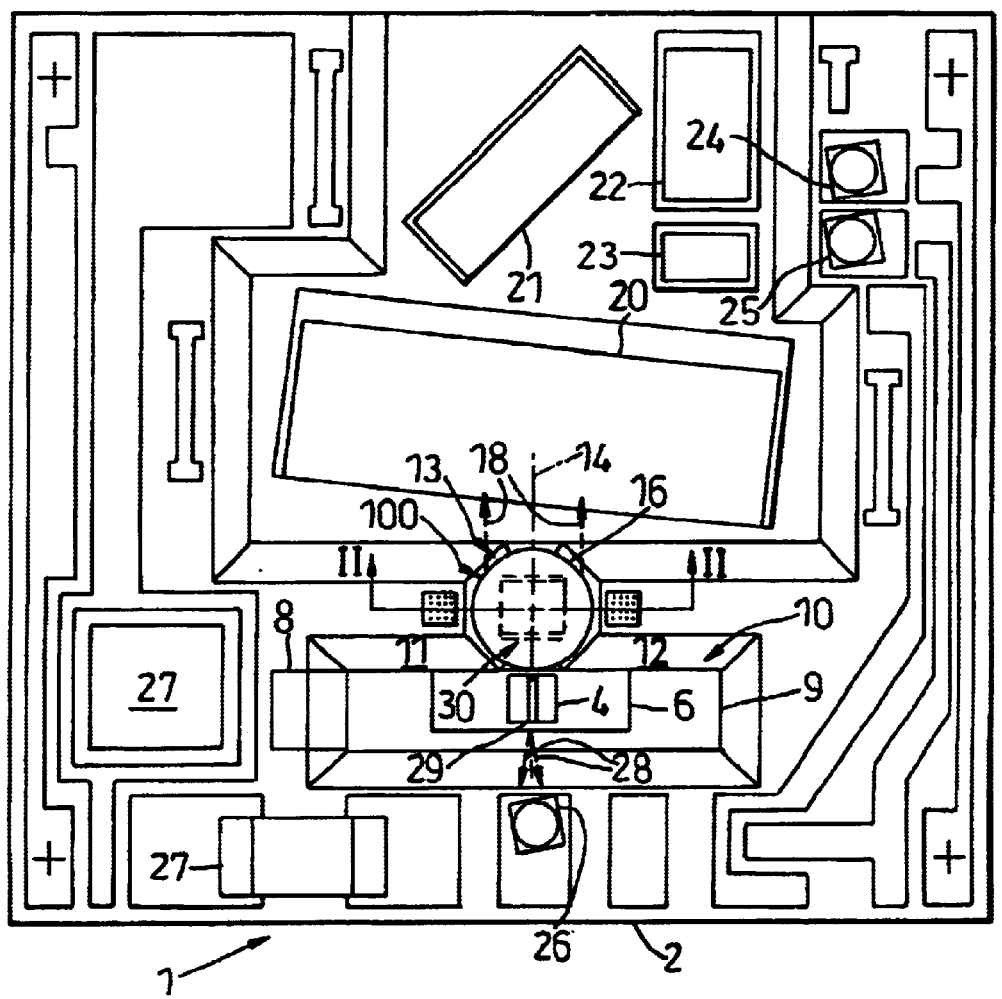
FIG. 1 is a schematic plan view of an opto-electronic device, having a micro-optical device according to the invention in the form of a ball collimating lens fuse-bonded via a stand to a silicon substrate and with a laser diode arranged to direct light into the lens.

FIG. 1 shows a schematic plan view of an opto-electronic device 1, here a hybrid chip that would be used in an optical transmitter unit in a fibre-optic transmission link. The device 1 is constructed on a silicon substrate 2 that is about 6 mm square and up to 2 mm thick. The substrate 2 has been etched and plated so that a number of opto-electronic, electronic and optical components can be secured to the substrate to form the working device 1.

The device 1 is based around a laser diode chip 4 held on a chip submount 6, which is itself bonded to a metalised ground strip 8 and extends across the floor 9 of a rectangular recess 10 in which the laser diode 4 is mounted. The recess 10 has along one side an upwardly tapering wall that is divided into two equal portions 11,12 either side of a groove-like channel 13 that extends in line with an optical axis 14 of the laser diode 4. A micro-optical element in the form of a ball lens 16 is mounted to the substrate 2 within the channel 13. In the context of the present invention, a micro-optical element is one having dimensions of about 5 mm or less. In many instances, a micro-optical element will have dimensions of the order of 100 μm to 1 mm.

Optical radiation, for example near infrared radiation 18 is collimated by the lens 16 and directed towards other optical elements, here a polarising isolator 20, beam splitter 21, two optical filters 22,23 and two prism/photodiode assemblies 24,25. Another prism/photodiode assembly 26 captures optical radiation 28 emitted by a back facet 29 of the laser diode 4 to monitor the optical power of the laser diode 4. A number of electrical components 27 are also secured to the substrate 2. The operation of the various optical and electronic components 20–27 is conventional, is not central to an understanding of the invention, and so will not be described in detail.

Figure 2:
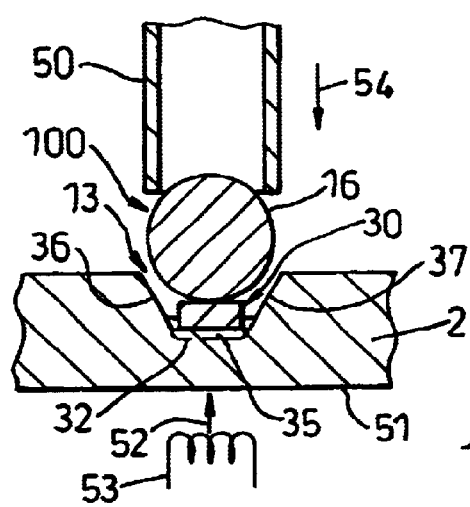
FIG. 2 is a cross-sectional schematic view of the lens, stand and substrate during the fuse-bonding process.
Figure 3:
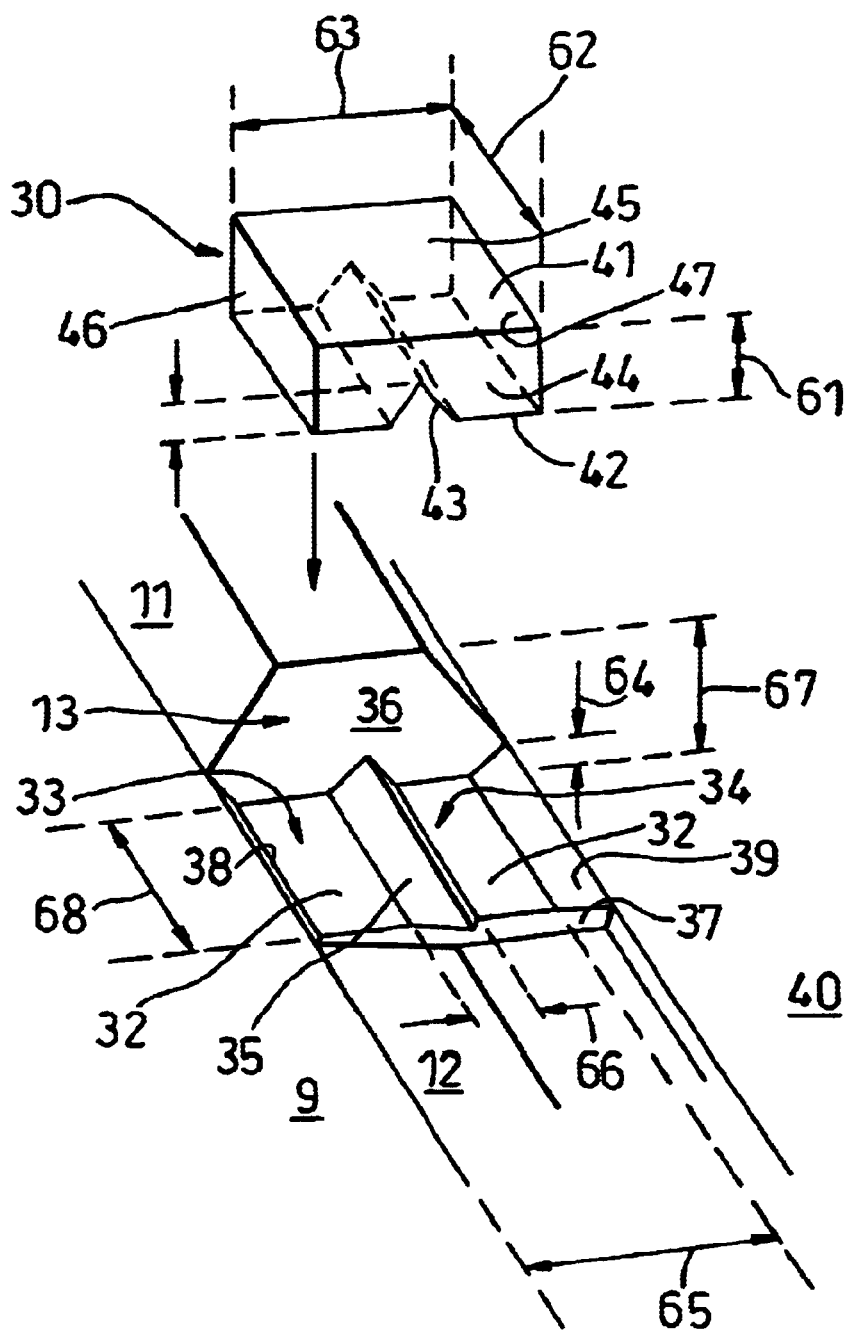
FIG. 3 is a perspective view of the stand and substrate prior to placement of the stand on the substrate.

Reference is now also made to FIG. 2, which shows a cross section through the device 1 taken along lines II—II, showing the process by which the ball lens 16 is secured to the substrate 2. A stand in the form of a partially fused glass frit 30 is first interposed between the ball lens 16 and a base surface 32 of the channel 13. The channel 13 and glass frit 30 are shown in more detail in FIG. 3. The frit 30 is a stand in the sense that the frit raises the ball lens 16 above the underlying surface of the substrate 2. The use of a stand is particularly helpful, as the thickness can be chosen to place the lens 16 at the correct height above the substrate 2 relative to the laser diode 4.

The base 32 of the channel 13 lies in a recess that has two equal rectangular halves, i.e., recesses 33 and 34, separated by a triangular cross section ridge 35 that extends between opposite side walls 36,37 of the channel 13 in a direction transverse to the channel side walls 36,37 and also transverse to the optical axis 14. Recess 33 is separated from the base 9 of the recess 10 in which the laser diode 4 is mounted, by a downwards tapering step 38. A similar step 39 separates recess 32 from a flat surface 40 on which the polarizing isolator 20 is mounted.

The glass fit 30 is approximately square in plan form looking down into the channel 13 and recesses 33,34, and has plane parallel upper and lower surfaces 41,42. The lower surface of the frit 30 is divided by a V-groove 43 that extends fully across the width of the flit 30 between opposite parallel vertically extending side walls 44,45. Running parallel to the length of the V-groove 43, are two other parallel vertically extending front and back walls 46,47. The shape of the V-groove 43 matches the profile of the triangular ridge 35 in the base 32 of the channel 13. Similarly, the nearly square plan profile of the flit 30 is such that the side, front and back walls 44–47 of the frit will fit between the corresponding surfaces 36–39 of the channel 13 when the base 42 of the frit 30 is resting against the base 32 of the channel 13. The clearance between the frit side walls 44,45 and channel side walls 36,37, and the clearance between the V-groove 43 of the frit and the triangular ridge 35 on the base 32 of the channel 13, is such that the glass frit 30 is simultaneously aligned within the channel 13 in the direction parallel to the optical axis 14, and also in a transverse direction in the plane of the channel base 32.

A micro-optical device 100 according to the invention is formed first by placing the frit 30 in the channel 13 as described above. This can be accomplished by conventional manipulator tools, for example a vacuum pick-up tool 50. Once the frit 30 is in place, the ball lens 16 can be similarly positioned up against the upper surface 41 of the frit. At this stage in the manufacture of the opto-electronic device 1, the position of the lens would be adjusted by moving the tool 50 until the correct optical performance for the device 1 has been determined. Once the ball lens 16 is in the correct position, heat 52 is applied to a rear surface 51 of the substrate 2 from a heating element 53. The heat applied is of the order of 425° C. to 475° C. The heat 52 is transmitted vertically upwards through the substrate 2 towards the glass frit 30. The glass frit is formed from partially fused silica with a high proportion of lead-oxide, so that the melting point of the glass frit 30 is below that for the glass ball lens 16. A downward pressure 54 is applied to the ball lens 16 by the vacuum pick-up tool 50, so that when the frit 30 begins to soften, the ball lens 16 is pressed gently into the upper surface 41 of the frit. At the same time, the lower surface 42 of the frit 30 begins to flow across the base 32 of the channel 13. Because the substrate 2 is formed from silicon, there will be a natural silicon-oxide surface coating to exposed portions of the substrate 2. Because of this, the heated glass frit 30 will form a good contact with the adjacent exposed portions of the substrate 2. The heating element 53 is then switched off, allowing the substrate, glass frit 30 and ball lens 16 to cool down, whereupon the now fused glass frit 30 solidifies to bond securely to both the ball lens 16 and base 32 of the channel 13.

The fuse-bonds thus formed are unaffected by subsequent processing of the opto-electronic device 1, for example soldering of electronic components 27 on the substrate 2.

In the present example the ball lens 16 has a radius of 400 $\mu$m, and the frit 30 has a thickness 61 of 300–350 $\mu$m, a width 62 of 300–350 $\mu$m and a length 63 of 400–450 $\mu$m. The base 32 of the channel 13 has a depth 64 of 100 $\mu$m beneath the level of the adjacent flat surfaces 9,40, and a width 68 about 25 $\mu$m more than the width 62 of the frit 30. The length 65 of the channel 13 is about 670 $\mu$m. The width 66 of the triangular ridge 35 is about 290 $\mu$m, and the height of the triangular ridge 35 above the surrounding base 32 of the channel 13 is about 100–125 $\mu$m. A depth of the V-groove 43 in the frit 30 is normally the same as the height of the triangular ridge 35.

The channel 13 has a total depth 67 which is about 650 $\mu$m, and the thickness of the silicon substrate 2 beneath this channel is about 1 mm.

For components such as those described above, it has been found that a good bond can be formed between the frit 30 and adjacent substrate 2 and ball lens 16, if the substrate is heated from underneath to about 460° C. A downward pressure of about 30 g is applied by the vacuum pick-up tool 50 against the ball lens 16. These conditions are held for about 30 seconds, and during this time the ball lens can be manipulated into the correct position relative to the laser diode 4. The heating of the substrate 2 then ceases, and once the substrate and frit have dropped to about 310° C., the frit solidifies to form a secure join between the ball lens 16 and substrate 2. The pressure applied by the manipulator can then be relieved. Shear testing on ball lenses joined in this way has shown that the join can withstand lateral forces of at least 1 N, which is sufficient for most uses of an opto-electronic device.

The invention provides a secure joint between a micro-optical component and a semi-conductor substrate. The invention is particularly useful with integrated micro-optical elements to be mounted on a silicon substrate, and also provides a convenient way in which such a joint and opto-electronic device incorporating such a micro-optical element can be manufactured. The joint is formed at a temperature above that normally reached in subsequent processing of an opto-electronic device, and is unaffected by any solvents that might be used in a manufacturing process. Furthermore, the joint does not outgas as might a joint formed from an epoxy resin. The joint does not creep by any significant amount over a typical lifetime of an electronic device, or as a result of temperature cycling. The invention therefore provides a convenient micro-optical device and method for forming such a device.

What is claimed is:

1. A micro-optical device comprising:
   a semiconductor material substrate;
   a glass material micro-optical element mounted on said substrate and;
   a glass-material stand interposed between said micro-optical element and said substrate, said stand being fuse-bonded to both said substrate and said micro-optical element,
   wherein said substrate has a recess in a surface thereof, said recess being bounded by one or more walls, and
   wherein said stand is dimensioned to fit within said recess and be positioned by one or more walls of said recess.

2. A micro-optical device as claimed in claim 1, in which said stand is a fused frit.

3. A micro-optical device as claimed in claim 1, in which said recess is in a groove with opposite side walls that position said stand in a first direction, and said recess and said stand have therebetween an alignment feature that aligns said stand in a second direction transverse to said first direction.

4. A micro-optical device as claimed in claim 3, in which said alignment feature is a ridge on one of said stand or said recess, and a groove, matching said ridge, on the other of said stand or said recess.

5. A micro-optical device as claimed in claim 4, in which said alignment feature is a ridge in said recess that extends between said opposite side walls.

6. A micro-optical device as claimed in claim 1, wherein said substrate is a silicon substrate.

7. An opto-electronic device, comprising:
   an opto-electronic element; and
   said micro-optical device of claim 1,
   wherein said opto-electronic element is secured to said substrate and coupled optically with said micro-optical element.

8. An opto-electric device as claimed in claim 7, wherein said micro-optical element is a lens arranged to couple optical radiation into or out of one or more opto-electronic elements.

9. A method of forming a micro-optical device, said device including a semiconductor material substrate a glass-material micro-optical element and a glass-material stand, wherein said method comprises the steps of:
   i) bringing together said micro-optical element and said substrate so that a stand is interposed between said micro-optical element and said substrate;
   ii) heating said stand so that said stand becomes fuse-bonded to both said substrate and said micro-optical element, thereby mounting said micro-optical element to said substrate;
   iii) using a manipulator to move and position said micro-optical element, and to apply a pressure between said micro-optical element, said stand and said substrate during said fuse-bonding of said stand to said micro-optical element and said substrate: and
   iv) then allowing said stand to cool down so as to fix a bond between said stand and said micro-optical element and between said stand and said substrate.

10. A method as claimed in claim 9, wherein step ii) is accomplished by applying heat through said substrate towards said stand.

11. A method as claimed in claim 9, wherein said pressure is relieved once said stand has cooled to fix said bond.

12. A method as claimed in claim 9, therein prior to step i) said stand is a partially fused glass-material frit.

13. A method of forming an opto-electronic device, said opto-electronic device including an opto-electronic element and a micro-optical device, said method comprising:
   (A) forming said micro-optical device by:
      i) bringing together said micro-optical element and a substrate so that a stand is interposed between said micro-optical element and said substrate;
      ii) heating said stand so that said stand becomes fuse-bonded to both said substrate and said micro-optical element, thereby mounting said micro-optical element to said substrate;
      iii) using a manipulator to move and position said micro-optical element, and to apply a pressure between said micro-optical element, said stand and said substrate during said fuse-bonding of said stand to said micro-optical element and said substrate; and
      iv) then allowing said stand to cool down so as to fix a bond between said stand and said micro-optical element and between said stand and said substrate; and (B) securing said opto-electronic element to said substrate so that said opto-electronic element is coupled optically with said said fuse-bonded micro-optical element.

14. The micro-optical device of claim 1, wherein said glass-material micro-optical element comprises a ball lens.

15. The method of claim 9, wherein said glass-material micro-optical element comprises a ball lens.

16. The method of claim 13, wherein said glass-material micro-optical element comprises a ball lens.

17. A micro-optical device, comprising:

a semiconductor material substrate;

a ball lens mounted on said substrate and;

a glass-material stand interposed between said ball lens and said substrate, said stand being fuse-bonded to both said substrate and said ball lens.

* * * * *